United States Patent [19]

Yoshisato

[11] 4,415,929
[45] Nov. 15, 1983

[54] VIDEO CLAMP CIRCUIT

[75] Inventor: Akiyuki Yoshisato, Soma, Japan

[73] Assignee: Alps Electric Co., Ltd., Tokyo, Japan

[21] Appl. No.: 311,064

[22] Filed: Oct. 13, 1981

[30] Foreign Application Priority Data

Oct. 15, 1980 [JP] Japan .................. 55/144202

[51] Int. Cl.³ .............................................. H04N 5/19
[52] U.S. Cl. ..................................... 358/171; 358/172
[58] Field of Search ............... 358/171, 172, 160, 166, 358/167; 375/1, 104; 458/305, 312; 329/122, 131–136

[56] References Cited

U.S. PATENT DOCUMENTS 4,237,489 12/1980 Kresock ............................ 358/172

FOREIGN PATENT DOCUMENTS 52-55321 5/1977 Japan .................................. 358/172

Primary Examiner—Michael A. Masinick
Attorney, Agent, or Firm—Guy M. Shoup; Gerard F. Dunne

[57] ABSTRACT

In a video signal processing circuit for removing an energy diffusion signal from a broadcasting satellite signal superposed with the energy diffusion signal, a video clamp circuit including a switching circuit for pedestal clamp for the purpose of maintaining a pedestal level as the basis of the black level of a video signal and a noise detection circuit for detecting the noise contained in the video signal, whereby the output from the noise detection circuit is applied to the switching circuit for pedestal clamp so that the clamp performance of the switching circuit for pedestal clamp is reduced by means of the output of the noise detection circuit when an S/N ratio applied to the noise detection circuit is not good, thereby improving the quality of the reception picture.

2 Claims, 10 Drawing Figures

VIDEO CLAMP CIRCUIT

BACKGROUND OF THE INVENTION

This invention relates to a video clamp circuit. More particularly, the present invention relates to a video clamp circuit which reduces the clamp performance of a switching circuit for pedestal clamp in accordance with the magnitude of a noise level contained in the video signal and removes an energy diffusion signal of a broadcasting satellite signal by means of a clamp pulse signal which is synchronized at a position subsequent to a burst signal provided to a horizontal synch pulse signal when the noise level is low.

In transmitting a video signal using a broadcasting satellite (or transmission via satellite), a video signal is subjected to frequency modulation (FM), and an energy diffusion signal in the form of a triangular wave signal of about 30 Hz is superposed with the video signal as shown in FIG. 1(A) in order to prevent interference at the time of demodulation.

Accordingly, a television receiver for receiving such a video signal is generally equipped with a clamp circuit subsequent to the demodulation circuit in order to clamp the pedestal level in synchronism with a synch signal and to remove the triangular wave signal (energy diffusion signal). FIG. 1(B) is a partially enlarged view of FIG. 1(A) and illustrates the pedestal clamp position while FIG. 1(C) is a partially enlarged view of FIG. 1(B) and is useful for explaining the time relationship of the clamp pulse.

In accordance with a conventional system, as shown in FIG. 2, a down-link signal from the satellite, which is frequency-converted into a video intermediate frequency (IF) of 70 MHz bandwidth, for example, is demodulated by an FM demodulation circuit 1, is then amplified by a first video amplification circuit 2 and is delivered to a de-emphasis circuit 3 for returning the signal back to its original form prior to the pre-emphasis placed on the signal when transmitted in order to prevent deterioration of the S/N ratio in the high bandwidths used. The signal is further amplified by a second video amplification circuit 4. An intercarrier system has generally been employed for the audio signals which system amplifies a composite video signal obtained by synthesizing the video signal and the audio carrier by the same intermediate frequency amplification circuit. A part of the output of the abovementioned second video amplification circuit 4 is sent to an audio demodulation circuit not shown so that the audio carrier is demodulated to provide the audio signal.

On the other hand, the output of the second video amplification circuit 4 is delivered to a video filter 5 which blocks the passage of the audio carrier but allows the passage of only the video carrier, and is then applied to a switching circuit for pedestal clamp consisting of an FET switching circuit 6, for example. The output of this FET switching circuit 6 is applied to a third video amplification circuit 7, and a part of the output of the third video amplification circuit 7 is in turn applied to a synch amplification circuit 8 which amplifies a synch signal separated from the input video signal and applies it to a logic circuit 9 which generates a clamp pulse in order to obtain a predetermined clamp level at a pedestal clamp position subsequent to a color burst signal that is inserted to the back porch of the horizontal synch signal as shown in FIG. 1(C). The logic circuit 9 generates the pulse for pedestal clamp subsequent to the color burst signal to be inserted to the back porch of the horizontal synch signal for each line of the field in the time relationship as shown in FIG. 1(C) thereby to actuate the FET switching circuit 6 and clamp the video signal sent from the video filter 5 at a predetermined position and thus remove the undesired triangular wave signal (the energy diffusion signal) of about 30 Hz. The system which arranges the pedestal levels in this manner is referred to as the "pedestal clamp system".

In the pedestal clamp systems in general, the clamp performance as a characteristic feature of the pulse clamp is extremely strong when the S/N ratio is good and a removing ratio of the diffusion signal as high as 46 to 50 dB, for example, can be obtained by the known systems. When the S/N ratio is not too good, on the other hand, since clamp is applied to the signal superposed with the noise, the pedestal level fluctuates in proportion to the level of superposition of the noise so that thin random horizontal stripes occur on the field or the picture surface. In a range in which the S/N ratio is not so bad and the picture can tolerably be observed, it is not possible for the logic circuit 9 to deliver the clamp pulse to the FET switching circuit 6 with accurate timing so that the clamp pulse is produced at a position other than the predetermined pedestal clamp position, such as inside the video signal for example, and a large amount of noise is produced on the field or the picture surface. In other words, the S/N level in such a case does not provide a tolerable picture at all. These are represented by dash lines (ii) in FIGS. 7(A) and 7(B).

FIG. 3 shows an example of the circuit construction of a so-called "reverse phase superposition system" which arranges the pedestal levels to a predetermined level. Reference numerals 1 through 5, 7 and 8 correspond to those used in FIG. 2. The output of the video filter 5 is applied to one input terminal of a differential amplification circuit 51, while a part of the output of the third video amplification circuit 7 is applied to a sample-and-hold circuit 52 and to the synch amplification circuit 8. After the synch signal is amplified by the synch amplification circuit 8, waveform shaping is effected in a waveform shaping circuit 53, thereby actuating the abovementioned sample-and-hold circuit 52.

The sample-and-hold circuit 52 samples and holds a d.c. voltage level following the color burst signal to be inserted to the back porch of the horizontal synch signal for each line of the field, and the signal is sent to an integration circuit 54 to produce the triangular wave signal and is then input to an amplification circuit 55, where the triangular wave signal is adjusted to a level of an opposite phase to the tilt of the pedestal level of the video signal applied from the video filter 5 to the differential amplification circuit 51, and is applied to the other input terminal of the differential amplification circuit 51. In this manner, the differential amplification circuit 51 removes the energy diffusion signal from the video signal sent from the video filter 5.

In this reverse phase wave superposition system, the triangular wave signal (or the energy diffusion signal) is detected and is then applied after being adjusted in the reverse phase in order to offset the triangular wave signal and to arrange the pedestal levels. Accordingly, though the erroneous operation due to noise is less, erroneous operation would occur if the level, which is to be applied after the phase inversion, fluctuates so that the removing ratio of the diffusion signal becomes lowered. Furthermore, due to the temperature stability of the circuit or its variance with the passage of time, 30 Hz stripes would occur on the field or the picture surface when the abovementioned removing ratio of the diffusion signal becomes below 30 dB. These are illustrated by dot-and-chain line (iii) in FIGS. 7(A) and 7(B).

SUMMARY OF THE INVENTION

To eliminate the abovementioned problems with the prior art, the present invention is directed to provide a video clamp circuit which includes a switching circuit for pedestal clamp which exhibits strong clamp performance inherent to the pedestal clamp system when the S/N ratio is good, but reduces gradually the clamp performance in accordance with the S/N ratio when the S/N ratio is not so good, and which reduces the erroneous clamp circuit operation due to noise.

The abovementioned and other objects, features and advantages of the present invention will become more apparent from the following description.

DESCRIPTION OF THE PREFERRED EMBODIMENTS

Hereinafter, the present invention will be described in detail by referring to FIGS. 4 through 7.

Figure 2:
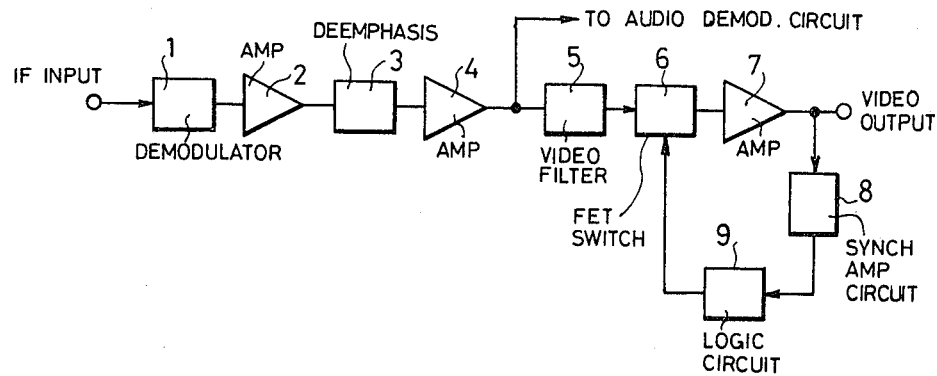
FIGS. 2 and 3 are block diagrams, each showing an example of the conventional circuit construction for video clamp.
Figure 3:
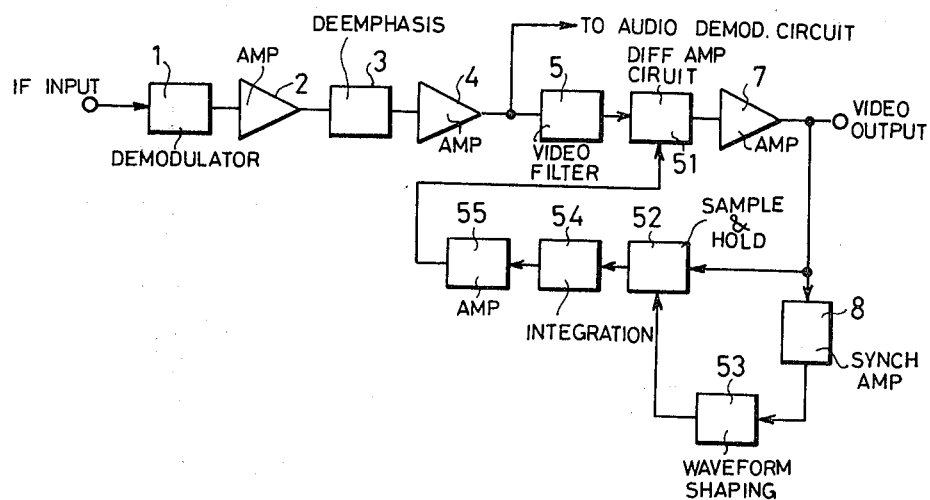
Figure 4:
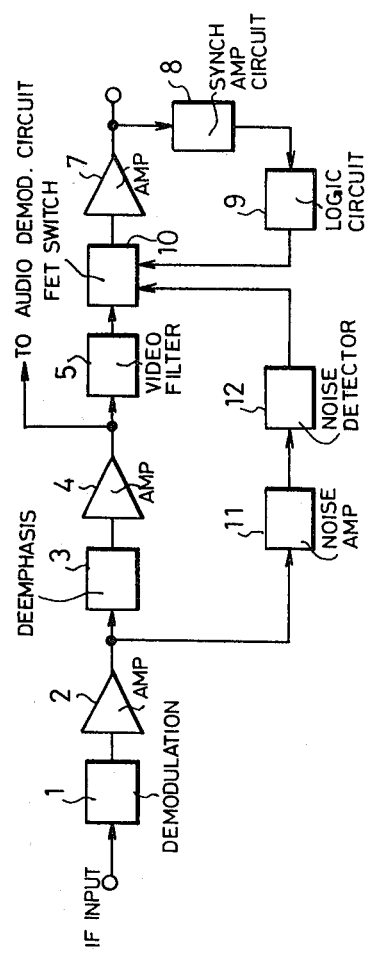
FIG. 4 is a block diagram showing an example of the circuit construction for video clamp in accordance with the present invention.

In FIG. 4, reference numerals 1 through 5 and 7 through 9 correspond to those used in FIG. 2. Reference numeral 10 represents a switching circuit for pedestal clamp, 11 represents a noise amplification circuit and 12 represents a noise detection circuit.

Figure 1A:
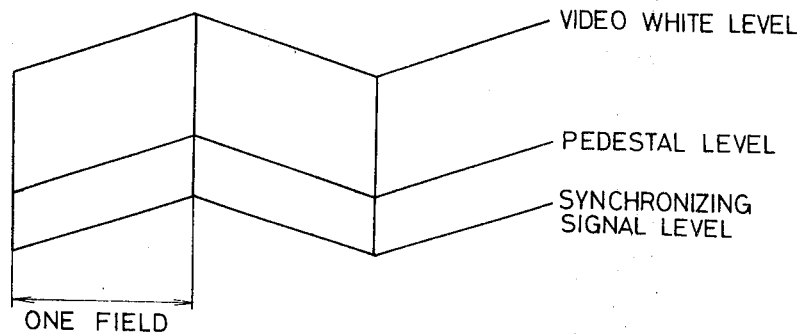
FIG. 1(A) is a diagram useful for explaining the mode of fluctuation of the pedestal level when a d.c. component is not transmitted.
Figure 1B:
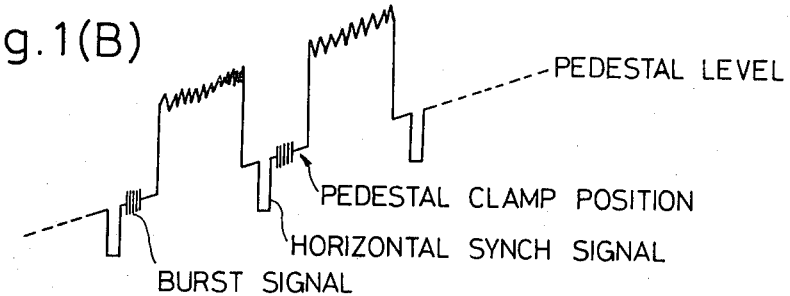
FIG. 1(B) is a partially enlarged view of FIG. 1(A)
Figure 1C:
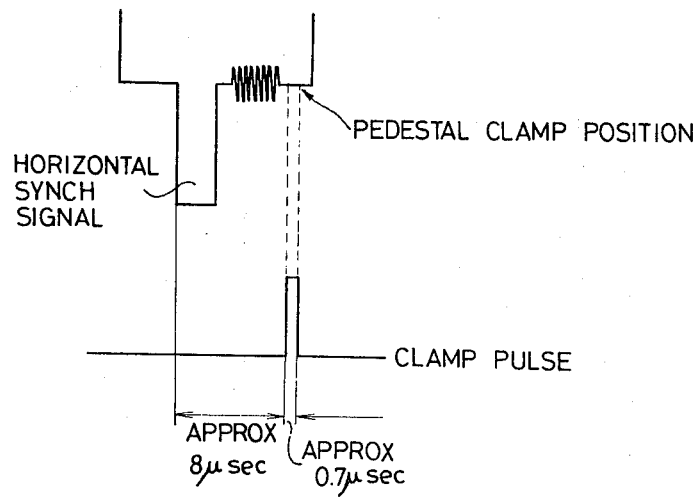
FIG. 1(C) is a partially enlarged view of FIG. 1(B)

A dual gate FET is employed as a switching element for the switching circuit 10 for pedestal clamp. A clamp pulse is applied to the first gate of the dual gate FET from the logic circuit 9 at the timing shown in FIG. 1(C). On the other hand, a noise signal component contained in the video signal is removed from a part of the output of the first video amplification circuit 2, is amplified by the noise amplification circuit 11, and is converted into a negative d.c. level by the noise detection circuit 12. The signal from the noise detection circuit 12 is then applied to the second gate of the dual gate FET that is used for the switching circuit 10 for pedestal clamp.

The dual gate FET operates in the following manner. Namely, the S/N ratio is good when the level of the noise signal contained in the video signal is small, and the voltage impressed on the second gate of the FET from the noise detection circuit 12 is substantially zero (V). Hence, the dual gate FET is controlled by the clamp pulse applied from the logic circuit 9 to the first gate and operates with strong clamp performance so that the pedestal level is aligned with a predetermined level. When the level of the noise signal contained in the video signal becomes greater, the S/N ratio is deteriorated and along therewith, the impressed voltage from the noise detection circuit 12 to the second gate of the dual gate FET becomes more negative so that the clamp performance is gradually lowered with deterioration of the S/N ratio. In this case, even if a clamp pulse occurs from the logic circuit 9 due to the noise, the dual gate FET does not operate and occurrence of the noise on the picture surface can be prevented. This is illustrated by solid lines (i) in FIGS. 7(A) and 7(B).

Figure 5:
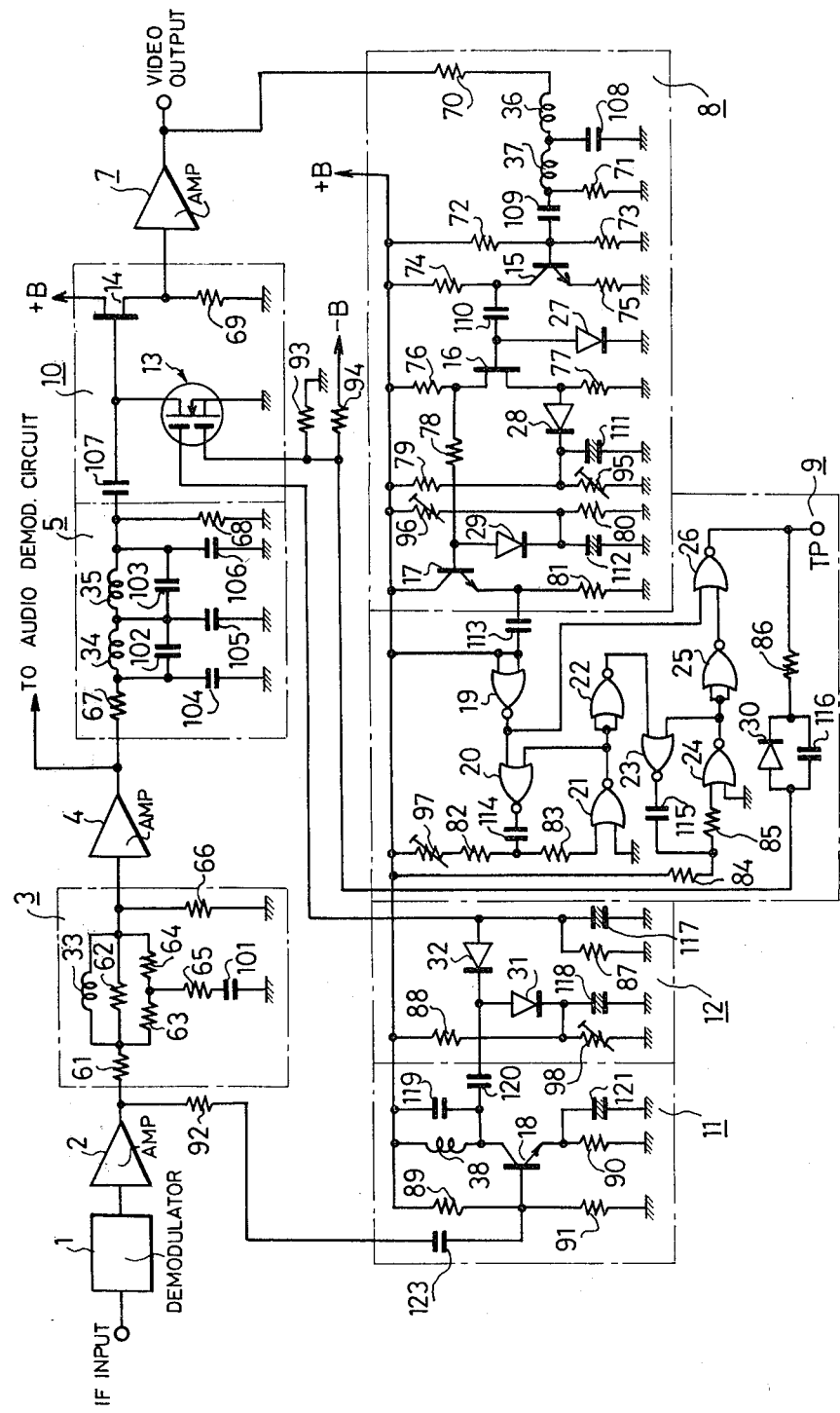
FIG. 5 is a circuit diagram showing an example of the circuit construction embodying each block of FIG. 4.

FIG. 5 is a circuit diagram definitely showing the construction of each block shown in FIG. 4, wherein reference numerals 1 through 5 and 7 through 9 correspond to those used in FIG. 2 while reference numerals 10 through 12 correspond to those used in FIG. 4. Reference numeral 13 represents a dual gate FET; 14 and 16 are FETs; 15, 17 and 18 are transistors; 27 through 32 are diodes; 33 through 38 are inductance coils; 61 through 94 are resistors; 95 through 98 are semi-fixed resistors; and 101 through 121 and 123 are capacitors.

A lowpass filter for damping the high range and noise components of the video signal, consisting of the coils 36, 37 and the capacitor 108, is disposed at the input of the synch amplification circuit 8, and a part of the output of the third video amplification circuit 7 is phase-inverted by the transistor 15 to provide a positive synch signal. Peak clamp is applied by the capacitor 110 and the diode 27 at the crest of the positive synch signal, thereby performing wave-shaping. The diode 28, which is connected to the source of the FET 16, is kept on during the period in which the synch signal exists so that the gain of the FET 16 increases to expand the synch component. Thereafter, the negative video signal portion is clipped by the diode 29 and only the synch signal is picked up from the output of the transistor 17 or the resistor 81. This synch signal is applied to the logic circuit 9 consisting of the NOR gates via the capacitor 113. The NOR gate 19 is used as an inverter, and the pulse width of a mono-stable multiple vibrator is set to about 8 μs as can be understood from the time chart representing the output of the NOR gate 22 in FIG. 6. The mono-stable multivibrator consists of the NOR gates 20, 21, 22, the combined resistance formed by the resistor 82 and the semi-fixed resistor 97, and the capacitor 114.

Figure 6:
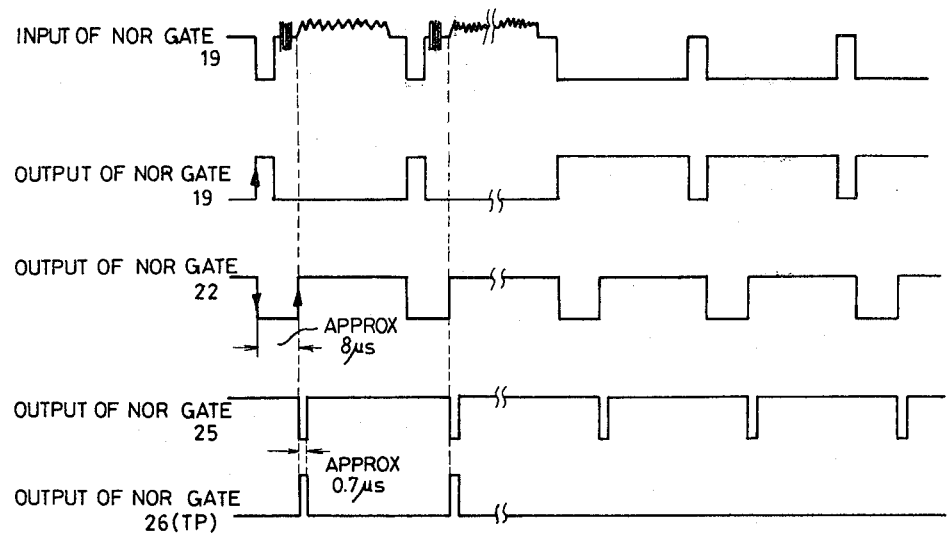
FIG. 6 is a diagram useful for explaining the operation of the logic circuit.

In a mono-stable multivibrator consisting of the resistor 84, the capacitor 115 and the NOR gates 23, 24, 25, on the other hand, a pulse of an about 0.7 μs width is produced from the rear edge of the about 8 μs pulse produced at the output of the NOR gate 22 as can be understood from the time chart representing the output of the NOR gate 25 in FIG. 6. By means of this pulse, the logic circuit 9 generates a clamp pulse at the position after the color burst signal to be inserted to the back porch of the horizontal synch signal, that is, at the position shown in FIG. 1(C). Only during the period of the vertical synch signal, the gate of the NOR gate 26 is closed lest the abovementioned clamp pulse of about 0.7 μs is produced from the logic circuit 9.

The dual gate FET 13 and the capacitor 107 inside the switching circuit 10 for pedestal clamp apply clamp to the video signal applied from the video filter 5, and the first gate of this dual FET 13 receives the clamp pulse from the logic circuit 9. On the other hand, its second gate is connected to the anode of the diode 32 of the noise detection circuit 12. Incidentally, the FET 14 is employed as an impedance converter in order to increase the input impedance.

The output of the first video amplification circuit 2 is applied via the capacitor 123 to the transistor 18 of the noise amplification circuit 11, and a resonance circuit consisting of the coil 38 and the capacitor 119 selects a signal of the frequency not associated with the video and audio carriers, that is, the noise, in order to tune with about 10 MHz, for example. After amplified by the transistor 18, the signal is detected in the negative voltage by the diodes 31, 32 of the noise detection circuit 12 and controls the dual gate FET 13 inside the switching circuit 10 for pedestal clamp in accordance with the magnitude of the ratio of the video signal component to the noise component S/N.

Accordingly, when the noise is small in the output of the first video amplification circuit 2 or when the S/N is in the good condition, the impressed voltage to the second gate of the dual gate FET 13 from the noise detection circuit 12 is substantially zero (V) so that the dual gate FET becomes conductive due to the clamp pulse generated from the logic circuit 9, thereby applying pedestal clamp and eliminating the energy diffusion signal. As the noise becomes gradually greater in the output of the first video amplification circuit 2, the S/N ratio becomes deteriorated so that the impressed voltage to the second gate of the dual gate FET 13 from the noise detection circuit 12 is urged to the negative, and the clamp capacity of the FET 13 is reduced. Hence, erroneous operation of clamp of the video signal arising from the noise is reduced.

Figure 7:
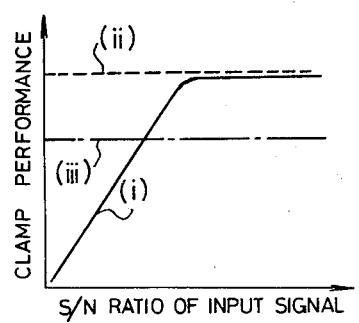
FIGS. 7(A) and 7(B) are characteristic curves showing the characteristics of the video clamp circuit in accordance with the present invention in comparison with the conventional clamp circuit.
Figure 7:
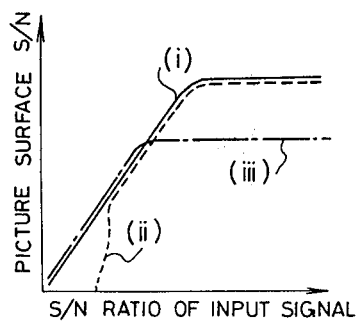

In FIGS. 7, 7(A) is a characteristic diagram depicted on the basis of results of experiments of the clamp performance with respect to the S/N ratio of the input signal. The pulse clamp system (ii) represented by dash line and the reverse phase superposition system (iii) represented by dot-and-dash line, both being the conventional pulse clamp system, have the predetermined clamp performance irrespective of the S/N of the input signal and the pulse clamp system (ii) has the higher clamp performance, as illustrated in the diagram. In comparison with the conventional methods, the clamp performance automatically drops in the present invention as the S/N ratio decreases.

FIG. 7(B) is a diagram showing the practical picture surface S/N relative to the S/N of the input signal. As can be seen, the picture surface S/N drops drastically in the conventional pulse clamp system (ii) due to the noise generated by the clamp circuit as the S/N ratio decreases. In the reverse phase wave superposition system (iii), the picture surface S/N is not necessarily high in the high input S/N range. By contrast, it is possible in accordance with the present invention to obtain a desired picture surface S/N from the range of the high input S/N ratio down to the low input S/N ratio.

Although the input signal of the synch amplification circuit 8 is shown taken out after the clamp as the output of the third video amplification circuit 7, the same effect could be obtained by taking out the input signal from the signal before the clamp, that is, from the output of the video filter 5, or from the input of the third video amplification circuit 7.

It is also possible to take out the input signal in the noise amplification circuit 11 from the circuits positioned at the prior stages to the video filter 5, and the same effect can also be obtained in such a case.

As described in the foregoing, the clamp performance of the switching circuit for pedestal clamp is exhibited when the S/N ratio is high and the clamp performance is gradually reduced in accordance with the S/N ratio when it is low. Accordingly, unlike the conventional clamp system which applies a clamp to a signal superposed with noise when the S/N ratio is low with the consequence that the pedestal level fluctuates by the level of the superposed noise and thin random horizontal stripes occurs on the picture, the present invention reduces the horizontal stripes and improves the picture quality by reducing the pedestal level.

In a range in which the picture can somehow be observed though the S/N ratio is not good, the present invention eliminates the noise on the picture surface by reducing the pedestal level and then reproduces a picture which is rather satisfactory.

In other words, the present invention makes it possible to receive and reproduce a signal superposed with an energy diffusion signal transmitted from a broadcasting satellite and thus to obtain a stable picture by suitably adjusting the pedestal clamp operation over a wide range of the input S/N ratio.

What is claimed is:

1. In a video signal processing circuit for removing an energy diffusion signal from a broadcasting satellite signal superposed with said energy diffusion signal, means including a video clamp circuit including a switching circuit for establishing the level of a clamping signal for removing said energy diffusion signal, means including a noise detection circuit for detecting the level of noise contained in said satellite signal, and means receiving the output from said noise detection circuit for reducing the level of the clamping signal of said switching circuit when the level of noise in said satellite signal exceeds a predetermined level.

2. The circuit as defined in claim 1 wherein said switching circuit is disposed subsequent to a video filter for blocking the passage of any audio carrier signal in said satellite signal and permitting the passage of only a video carrier signal of said satellite signal, and includes an FET having a drain, a source and first and second gates, means converting the output of said noise detection circuit to a noise signal proportional to the level of noise but having a negative magnitude and directing said noise signal to said second gate, means for generating a positive clamp pulse from a horizontal synchronizing signal in said satellite signal and directing said clamp pulse to said first gate.

* * * * *